Patented Feb. 21, 1928.

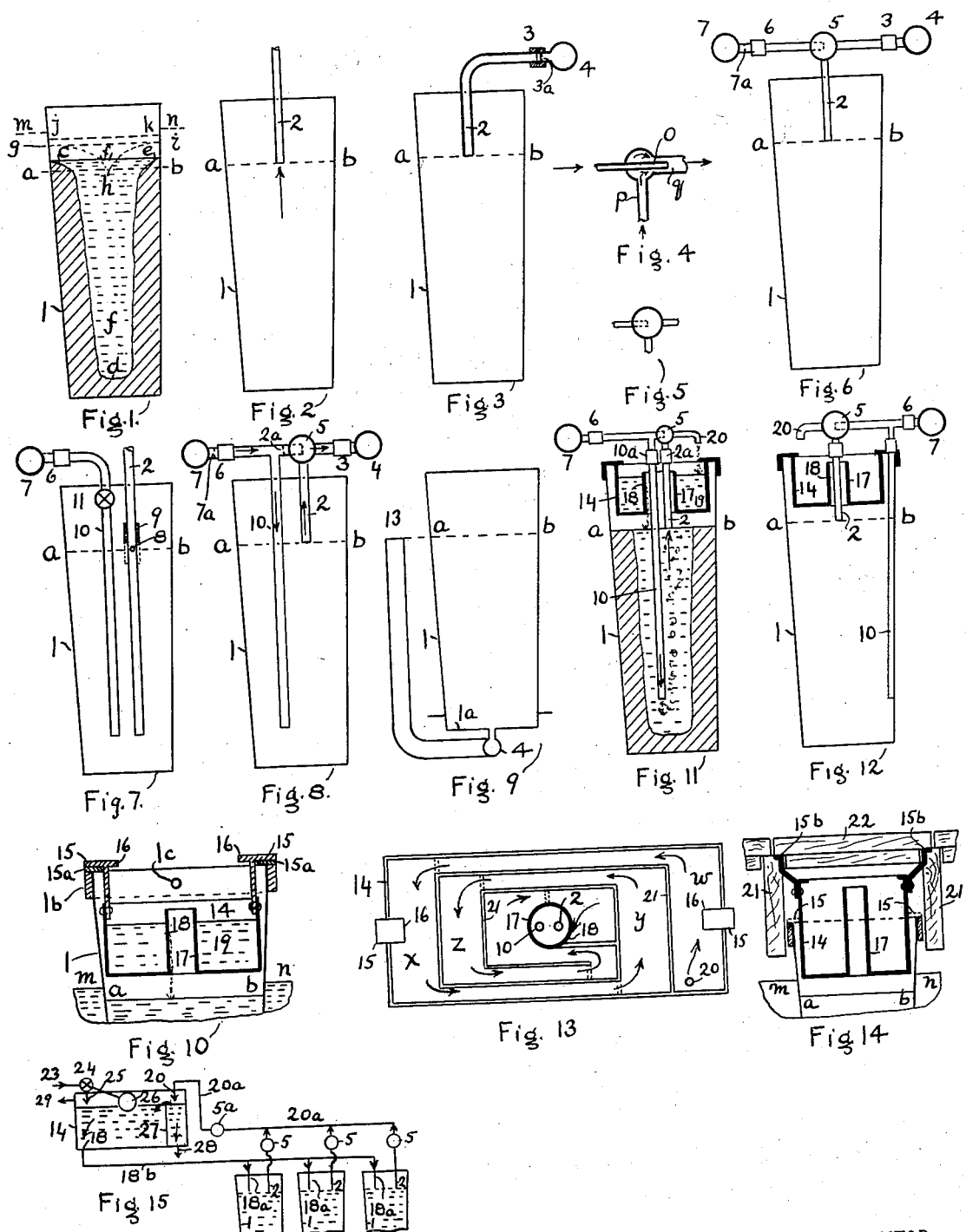

1,659,845

UNITED STATES PATENT OFFICE.

GARDNER TUFTS VOORHEES, OF BOSTON, MASSACHUSETTS.

ICE-MAKING PROCESS AND APPARATUS.

Application filed July 5, 1923. Serial No. 649,632.

This invention relates most particularly to making ice in cans or moulds by subjecting them to cooling means and has for its object the rendering of the process more expeditious, sanitary, and economical.

The objects of my invention are, to produce an ice cake in less time, or to make it more economically, as to power and labor, or to make it purer, or of better appearance, or more uniform in size and weight, or a combination of two or more of said objects.

In the drawings which are diagrammatic, Figs. 1, 2, 3, 6, 7, 8, 9, 11, 12 are part sectional elevations of ice cans for use with my invention. Fig. 4 is a jet pump, and Fig. 5 a diagrammatic symbol, used for a jet pump, in other figures. Fig. 10 is a sectional elevation of a water pan in the upper part of a can.

Fig. 13 is a plan of a water pan.

Fig. 14 is a section of a water pan shown in elevation.

Fig. 15 is a sectional elevation of a plurality of cans and water pan.

By my invention I maintain the top of the ice cake at practically the same level as that of the initial unfrozen water, by taking the raised up water, due to expansion in freezing, away as it is formed and I take away a quantity of concentrated impurities otherwise usually frozen into the core of the ice cake.

In all the figures, 1, is an ice can and similar numbers are used for similar parts of the apparatus in the figures.

In Fig. 1, $a$—$b$ is the original water level in can 1, $c$—$d$—$e$ being an inner ice surface during the freezing. $f$ is the unfrozen water, or pocket, or core at this stage of the process. $g$—$h$—$i$ is the ice surface at a later stage, where $h$ is the bottom of pocket $f$, at the original water level $a$—$b$. $j$—$k$ is the top of the completely frozen ice cake. $m$—$n$ is the brine level preferably above $j$—$k$.

In practice, brine level $m$—$n$, is often a little above or below original water level at $a$—$b$, which causes a retarded freezing of the upper part of the ice cake.

During freezing the water in the can expands about 8½% in volume, thus raising the level of the top of the ice cake above the original water level $a$—$b$, to the finished ice cake level $j$—$k$.

The part of the ice cake above $a$—$b$ does not have as long a time in contact with the can surface and so it forms more slowly.

With a standard 300 pound can the top of the ice cake is 3 to 3½ inches above the top of the original water and requires around 8½% more time to freeze solid, below level $j$—$k$, than to freeze solid below line $a$—$b$.

With a standard 400 pound can the expansion is about 4 to 4½ inches and requires about 10½% longer to freeze solid to line $j$—$k$ than below to line $a$—$b$.

The greater part of all the impurities in the original water are gradually concentrated in the center pocket or core.

When bacteria are present, there is a much larger count, in the core, than in the original water.

When soluble salts or other matter is present, they concentrate in the core and make it white and often require a colder temperature to freeze and so further delay the formation of a completely frozen ice cake.

The top of ice and water surface in a can is directly under a warm can cover and so is subjected to heat loss by radiation.

By maintaining the top of ice level at the original water level I hasten the time of freezing the finished ice cake and abstract 8½% or more of the water and so a large part of the concentrated impurities of the core and by a radiation shield over the top of the ice and water level, I shut off some radiation losses.

By adding new water during freezing I still further reduce pollution of the core.

In Fig. 2, 2 is a tube or pipe, which by any desired suction means, sucks water from can 1 at level $a$—$b$, and so maintains it practically constant. Can 1 may be an individual can, or one of a plurality of cans, in all the figures.

In Fig. 3 pipe 2 is coupled by coupling 3 to an inlet to conduit 4, conduit 4 may similarly connect to other cans and is provided with any desired suction means to cause it to suck from tube or tubes 2. 3$^a$ is an orifice to equalize the suction effect of 4 on several tubes 2.

Fig. 4 shows a jet pump having fluid operating jet $o$ and suction inlet $p$ and discharge outlet $q$, fluid operating jet $o$, may be of liquid, or gas, or both.

Fig. 5 is a diagrammatic symbol, used in other figures to represent jet pump of Fig. 4.

In Fig. 6 jet pump 5 is shown connected by coupling 6 to an outlet from pipe 7, pipe 7 supplying the fluid for operating jet of 5.

Pipe 7, may feed a plurality of jet pumps 5, in a plurality of cans 1, and discharge expanded water, from the plurality of cans, via a plurality of pumps 5 into pipe 4.

Pipe 4 may be an open channel.

$7^a$ is an orifice to equalize the distribution of jets from pipes 7 to pumps 5.

In Fig. 7, suction pipe 2 may extend down below level $a$—$b$ and may have holes 8 at level $a$—$b$ and a sliding sleeve 9, that can slip over them. By this water can be withdrawn from the entire core by slipping 9 over 8 and new water may be supplied to core in any desired way or via pipe 10, and the operation continued, with holes 8 uncovered.

In all raw water ice it is necessary to agitate the water to have clear ice, so that air bubbles, or gas bubbles, will be dislodged from the ice crystals.

10 is a pipe that conducts air or gas or water or all to agitate the water in can 1.

11 is a valve that may be used to shut off supply of water when pipe 2 sucks cores with sleeve 9 over holes 8.

Obviously valve 11 could be in pipe 7 and used to shut off a plurality of pipes 10 in a plurality of cans 1.

If sucking capacity of 2, exceeds supply capacity of 10 then new water may be continuously supplied to can and sucked out by pipe 2.

Pipes 2, 10 may be removed before the freezing is completed or they may be frozen in and then thawed out and removed later on.

In Fig. 8 both agitating pipe 10 and pump 5 are fed from pipe 7. Orifices may be used at $7^a$ and $2^a$ to regulate the desired flow in pipes 10 and 2.

Pipes 4 and 7 may be located so as to be exposed to air, above the tank, for warming effect, to prevent their freezing up.

In Fig. 9, 1 is one of a plurality of cans, having nonfreezing bottoms $1^a$, each having a pipe 2 connected to a pipe 4 that overflows at 13, at level $a$—$b$. This will keep a practically constant ice and water level $a$—$b$ in cans 1.

In the preceding figures, there is a possibility of conduit 4 getting frozen and if new water is supplied via pipe 10, there is danger of its freezing in pipe 7, or defective parts or operation may flood the cans or tank with water, or not keep level $a$—$b$ constant.

To prevent this I use a vessel of any desired shape or size, in any desired location, but preferably as shown in Fig. 10.

In Fig. 10, pan 14 is placed over the can 1, pan 14 has lugs 15 to support it on the top of the can and may be so placed as not to be in the way of lifting holes $1^c$ in can band $1^b$.

Means as lugs 16 may be used to lift pan 14 from can 1. Pan 14 may have a central overflow portion 17 that may serve for the passage of pipes 10 and 2, of Fig. 8, to pass through it to can 1. 17 may have an overflow orifice 18 to return a desired portion of water 19 from pan 14 to can 1. Lugs 15 or pan 14 or both may be insulated or of insulating material or lugs 15 may have insulated parts $15^a$, where they rest on can top.

Water 19 in pan 14 may have been put there in any desired way or may have all come from can 1 and all or part of it may recirculate to can 1 via hole 18 or water once in pan 14 may stay there with hole 18 omitted.

Fig. 11 shows pan 14 of Fig. 10 and Fig. 8, combined and shows water outlet 20 from jet pump 5 to pan 14. $10^a$ and $2^a$ are couplings so tubes 10 and 2 may be left frozen into the ice and pan 14 removed. Pan 14 may be harvested with can and removed at the ice dump and cleaned and returned to place or may be removed before can is harvested, as is desired.

In Fig. 11, pan 14 finally contains the expanded water after its first removal from can 1 with hole 18 not in use, or with hole 18 in use the water is recirculated from pan 14 to pan 1. Before freezing is finished water 19 may be withdrawn in any desired manner from pan 14 and replaced with new water, in any desired manner or at any desired period or periods of the process.

Coupling 3 of Fig. 3 may be disconnected after freezing is finished and tube 2 may be thawed from frozen contact with the top of the ice cake.

Coupling 6 of Fig. 7 may be similarly used and pipe 10 thawed out from the finished ice cake.

Couplings 3 and 6 of Fig. 8 and $10^a$ and $2^a$ of Fig. 11 may be similarly used and tubes 10 and 2 thawed out from the finished ice cake.

Fig. 12 is similar to Fig. 11, except here pipe 10 goes down a side of can 1.

Fig. 13 is a plan of water pan 14, showing how pan 14 may be divided into compartments in any desired manner, as by partition 21. These compartments may be used for separation of impurities as by a settling compartment at $w$, a filtering compartment at $x$, a chemical water softening and treating compartment at $y$, a treating compartment as for violet rays, ozone, etc., at $z$. All so that water in can 1 may be more thoroughly purified and so as to improve the clearness and purity of the finished ice cake.

In practice a considerable portion of the upper part of the can is not occupied by water or ice.

I utilize this space with the water pan as a water space for diluting the polluted water. This water may all first be in can, or pan or part in each. The more water I have in pan 14, the less polluted water will remain in the core of the finished ice cake.

In Fig. 14, pan 14 may have more volume if it extends above can 1, and may be supported on can 1, as before, by lugs 15 or by lugs 15$^b$ that rest on the frame work of the tank over the can. Here supports 15$^b$ engage supports 21, that support covers 22. In Fig. 14, the upper part of pan 14 is also in a warmer zone and is supported by warmer material as the wood of supports 21.

Container 14 of Fig. 14 may be adapted to hold more than the expanded water, in which case there is more purifying action. The greater the bulk of water, in pan 14, the greater will be its capacity for purifying the finished ice cake. The can may originally have water above its working upper, common water and ice level $a\ b$, or excess water may be in pan 14. In either case the sucking action at the desired common upper water and ice level, $a\ b$, in can, will promptly remove any surplus water above it, to container 14.

In Fig. 15 is shown a plurality of cans 1 having a plurality of tubes 2 and a plurality of pumps 5 or a suction means 5$^a$ or both 5 and 5$^a$, that discharge via pipe 20 into pan 14 having partition 27 and restricted polluted water outlet 28 and new water inlet 23, 25 governed by valve 24 and float 26. Water from pan 14 recirculates via outlet 18 and pipe 18$^b$ and plurality of tubes 18$^a$ to cans 1. The capacity of tubes 2, should exceed the capacity of tubes 18$^a$ as to water circulated. That is tubes 2 should suck air and water. Circulation is shown by arrows. With 14 covered cold air from 20 may serve to feed an air compressor via pipe 29. This cold air can be used for any desired purpose as for feeding air to pipes 7 of the various figures above described.

All cores should be pulled, particularly for raw water ice so as to lessen the bacteria and unsanitary matter and undesirable concentrations of salts.

In many ice plants, the time and labor required for so doing is an excuse for omitting to do so, particularly in hot weather.

My invention will obviate this excuse, because of the automatic features it possesses and because more ice will be yielded than heretofore because of the nonfreezing above the original water level and other improvements herein set forth. Obviously this invention may be applied in many ways not specifically here shown without departing from the broad underlying principles of this invention, which I desire to claim in the broadest possible manner.

The approximately vertical central tube 17, of pan 14 of Figs. 13, 14, is preferably located, as shown, over the center of the top of a can.

Tubes 2 and 10 are preferably centrally located and preferably approximately vertical over the center of top of can 1. If tube 10 is not used, as in Figs. 1 to 6, then tube 2 is preferably vertical and is preferably approximately centrally located over the top of can 1. This tube 2, or tubes 2 and 10, are approximately equidistant from the four sides of the can and so are in the last part of water to freeze and so are most effective for the many desired purposes of this invention.

In the claims, when I say "expanded water", I mean the water that would occupy extra space, due to its displacement, because of the greater volume of a given weight of ice, than that of the same weight of water.

What I claim is:—

1. The process of freezing a given volume of ice in a container so as to occupy substantially the same volume as that of a body of water, originally occupying the ice space, by simultaneously conducting heat from the water and maintaining the water's upper surface in the can at substantially the level of that of the original body of water by suctionally upwardly removing its excess expanded volume, the water's upper surface being exposed to atmospheric pressure.

2. The process of freezing a given volume of ice in a container so as to occupy substantially the same volume as that of a body of water originally occupying the ice space by simultaneously conducting heat from the water and maintaining the water's upper surface in the can at substantially the level of that of the original body of water by suctionally upwardly removing its excess expanded volume and circulating said expanded or other water between another container and the original container.

3. The process of freezing a given volume of ice in a can so as to occupy substantially the same volume as that of a body of water originally occupying the ice space by simultaneously extracting heat and impurities from the water in the can and maintaining the water's upper surface in the can at substantially the level of that of the original body of water by suctionally upwardly circulating its excess volume between the can and a purifying vessel located above the water in said can.

4. In a process for freezing an ice cake in a can by conducting heat thereto from a body of water therein, the method of maintaining a practically constant common upper water and ice level in the can by causing means to suctionally upwardly remove any accumulation of expanded and other water from the can, that would otherwise tend to have raised said water and ice level.

5. In a process for freezing an ice cake in a can by conducting heat thereto from a body of water therein the method of maintaining a practically constant common upper water and ice level in the can by causing means to suctionally upwardly suck up from said water and ice level, any accumulation of expanded or circulating water that would otherwise tend to have raised said common water and ice level.

6. In a process for freezing an ice cake in a can by conducting heat thereto from a body of water therein, the method of maintaining a practically constant common upper water and ice level in the can by causing means to suctionally upwardly suck up from the central portion of said water and ice level, any accumulation of expanded or circulating water that would otherwise tend to have raised said common water and ice level.

7. In a process for freezing an ice cake in a can by conducting heat thereto from a body of water therein, the method of maintaining a practically common constant upper water and ice level in the can by causing jet actuated means to suctionally upwardly suck up from said water and ice level any accumulation of expanded or circulating water that would otherwise tend to have raised said common water and ice level.

8. In a process for freezing an ice cake in a can by conducting heat thereto from a body of water therein, the method of maintaining a practically constant common upper water and ice level in the can by causing jet actuated means to suctionally upwardly suck up from the central portion of said water and ice level, any accumulation of expanded or circulating water that would otherwise tend to have raised said common water and ice level.

9. In a process for freezing an ice cake in a can by conducting heat thereto from a body of water therein the method of maintaining a practically constant common upper water and ice level in the can by causing air jet actuated means to suctionally upwardly suck up from said water and ice level any accumulation of expanded or circulating water that would otherwise tend to have raised said common water and ice level.

10. In a process for freezing an ice cake in a can by conducting heat thereto from a body of water therein, the method of maintaining a practically constant common upper water and ice level in the can by causing air jet actuated means to suctionally upwardly suck up from the central portion of said water and ice level, any accumulation of expanded or circulating water that would otherwise tend to have raised said common water and ice level.

11. The process of making an ice cake in a can by conducting heat thereto from a body of water therein, the water's upper surface being exposed to atmospheric pressure, means adapted to so suctionally upwardly remove expanded water from the can as to maintain a practically constant common upper water and ice level.

12. The process of making an ice cake in a can by conducting heat thereto from a body of water therein, the water's upper surface being exposed to atmospheric pressure, means adapted to so suctionally upwardly remove expanded water from the vertical central portion of the can so as to maintain a practically constant common upper water and ice level.

13. The process of making an ice cake in a can by conducting heat thereto from a body of water therein, the water's upper surface being exposed to atmospheric pressure, means adapted to so suctionally upwardly remove expanded water from the top of the vertical central portion of the water so as to maintain a practically constant common upper water and ice level.

14. In an ice making process wherein water is made into ice, in a container by freezing water therein by conduction of heat therefrom, the method of putting a desired quantity of water in the container, up to a desired level therein, and then suctionally upwardly removing expanded water as the ice forms therein so that the top of the finished ice cake is at practically the same level as the top of the original water and so that the finished ice block weighs less than the original quantity of water put into the can, the upper water and ice level being exposed to atmospheric pressure.

15. In an ice making process wherein water is made into ice in a plurality of containers by freezing water therein by conducting heat therefrom, the method of putting a desired quantity of water in each can, up to a desired level therein, exposed to atmospheric pressure, and then suctionally upwardly removing therefrom, expanded water, as the ice forms therein, so that the tops of the finished ice cakes are at atmospheric pressure and are at practically the same level as the tops of the original water therein and so that the finished ice cakes each weigh less than the original quantity of water that was put into each can.

16. In an ice making process wherein water is made into ice in a container by freezing water therein by conducting heat therefrom, the method of causing a supply of air to continuously cause agitation of water in the container and to remove substantially all expanded water from the container.

17. In an ice making process wherein water is made into ice in a container by conducting heat therefrom, the method of causing circulation of water in the container and suctionally upwardly removing expanded water from the container and adding water to the container, all so as to maintain a practically constant common upper water and ice level.

18. The combination of an ice can with a suction tube having an opening at a desired practically constant upper common ice and water level in said can with means to cause a suction in said tube.

19. The combination of an ice can with a suction tube having an opening at a desired practically constant upper common ice and water level in said can and a jet pump adapted to cause a suction in said tube.

20. The combination of an ice can with a suction tube having an opening at a desired practically constant upper common ice and water level in said can and a jet pump adapted to cause suction in said tube and actuated by a jet from a fluid supply particularly used for agitation of water in said can.

21. The combination of an ice can with a vessel in its upper portion and with a tube having an opening at a desired practically constant upper water level in said can and a jet pump adapted to cause suction in said tube and to discharge into said vessel, the bottom of said vessel being above said desired upper water level in said can.

22. The combination of an ice can with a vessel in its upper portion with a tube having an opening at a desired practically constant upper water level, below the bottom of said vessel, in said can and a jet pump adapted to cause suction in said tube and to discharge into said vessel and a conduit adapted to conduct water from said vessel to said can.

23. The combination of an ice can with a vessel in its upper portion with a tube having an opening at a practically constant desired upper water level, below the bottom of said vessel, in said can and a jet pump adapted to cause suction in said tube and to discharge into said vessel with impurity separating means in said vessel and a conduit adapted to convey water from said vessel back to said can.

24. A fitting for ice cans having an air inlet conduit and a water inlet conduit and two air outlet conduits and an air and water outlet conduit, the air inlet conduit adapted to convey air under pressure to the fitting, the water inlet conduit adapted to convey water from an ice can, one air outlet conduit adapted to convey air for agitation purposes to water in an ice can, the other air outlet conduit adapted to act as a motive jet to suck in water from the water inlet conduit and to discharge it through the air and water outlet conduit.

25. In an ice making process the method of preventing the rise of water level in a body of water being frozen, because of additional volume occupied by its ice, by causing said water to close an opening into a suction means so that said suction means will suck up and remove water from its upper surface which would otherwise raise said water level.

26. The combination of an ice can with a tube having an upper opening at a desired practically constant upper water level in said can with means to cause a suction in said tube, said tube being adapted to extend down below said water level and being provided with an adjustable means to close its upper opening.

GARDNER TUFTS VOORHEES.